United States Patent [19]
Meulnart

[11] Patent Number: 5,477,762
[45] Date of Patent: Dec. 26, 1995

[54] DEVICE FOR AUTOMATIC CUTTING OF MUSHROOM STEMS

[75] Inventor: Alain Meulnart, Paris, France

[73] Assignee: S.A. Royal Champignon, Saumur Cedex, France

[21] Appl. No.: 170,170

[22] PCT Filed: Jun. 24, 1992

[86] PCT No.: PCT/FR92/00571

§ 371 Date: Dec. 23, 1993

§ 102(e) Date: Dec. 23, 1993

[87] PCT Pub. No.: WO93/00022

PCT Pub. Date: Jan. 7, 1993

[30] Foreign Application Priority Data

Jun. 25, 1991 [FR] France ................... 91 07782

[51] Int. Cl.⁶ .................................................. A23N 15/04
[52] U.S. Cl. ........................... 83/364; 83/365; 83/367; 83/368; 83/403.1; 83/435.2; 83/932; 99/643
[58] Field of Search ................ 83/364, 365, 368, 83/370, 403.1, 435.2, 504, 932, 367, 360; 99/642, 643

[56] References Cited

U.S. PATENT DOCUMENTS

| | | | |
|---|---|---|---|
| 2,621,692 | 12/1952 | Urschel et al. | 83/368 |
| 2,837,131 | 6/1958 | Fried | 99/643 |
| 2,858,865 | 11/1958 | Fleming et al. | 99/643 |
| 2,877,816 | 3/1959 | Kibler et al. | 99/643 |
| 4,198,903 | 4/1980 | Turatti | |
| 4,457,434 | 7/1984 | Brown et al. | |
| 4,549,453 | 10/1985 | Yazaki et al. | 83/368 |
| 4,576,071 | 3/1986 | Rayment | 83/364 |
| 4,750,732 | 6/1988 | Hara et al. | 271/258 |

FOREIGN PATENT DOCUMENTS

| | | |
|---|---|---|
| 2038068 | 1/1971 | France . |
| 2161405 | 7/1973 | France . |
| 2595589 | 9/1987 | France . |

*Primary Examiner*—Richard K. Seidel
*Assistant Examiner*—Allan M. Schrock
*Attorney, Agent, or Firm*—Jacobson, Price, Holman & Stern

[57] ABSTRACT

According to the invention, the cutting station also comprises, on the one hand, detection means capable of individually determining the length of the stem of each mushroom and, on the other hand, control means capable of adjusting the relative position of the cutting device and of the mushroom stem as a function of the length of stem determined by the said detection means.

13 Claims, 4 Drawing Sheets

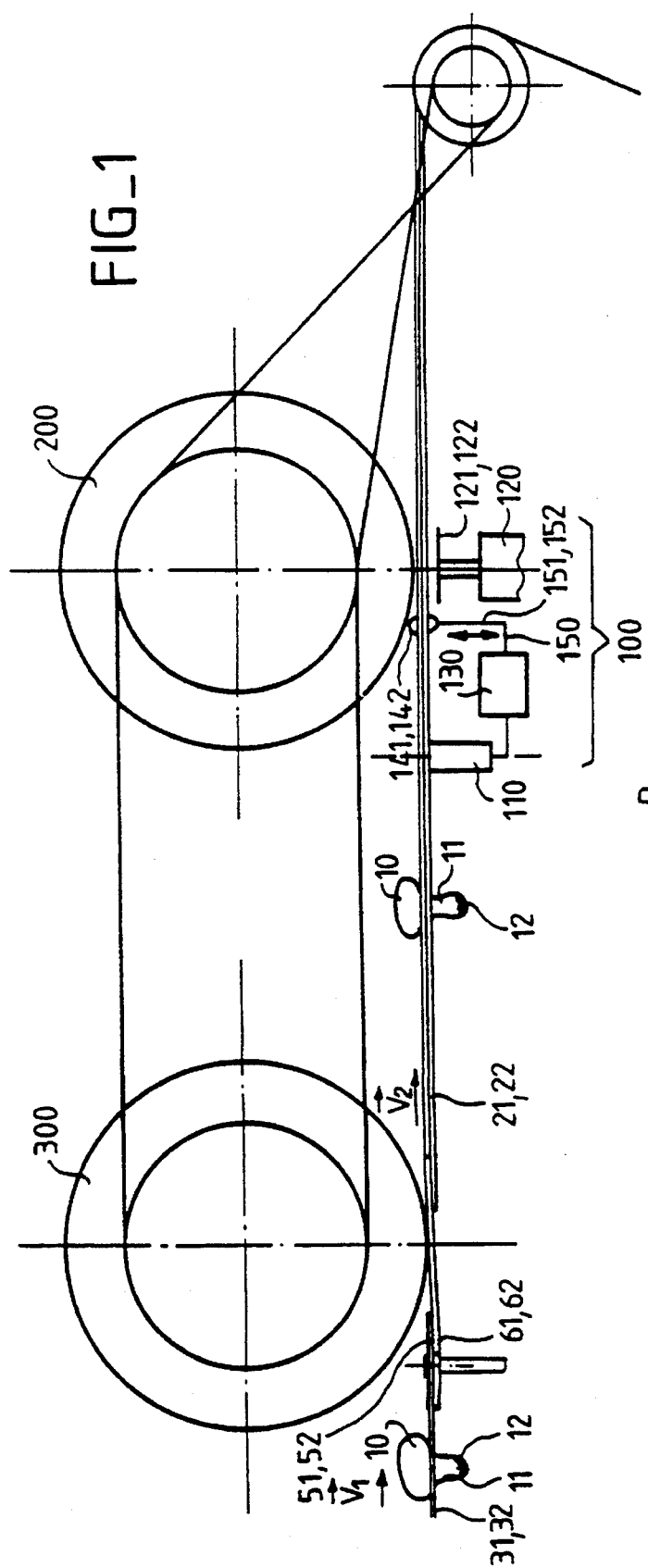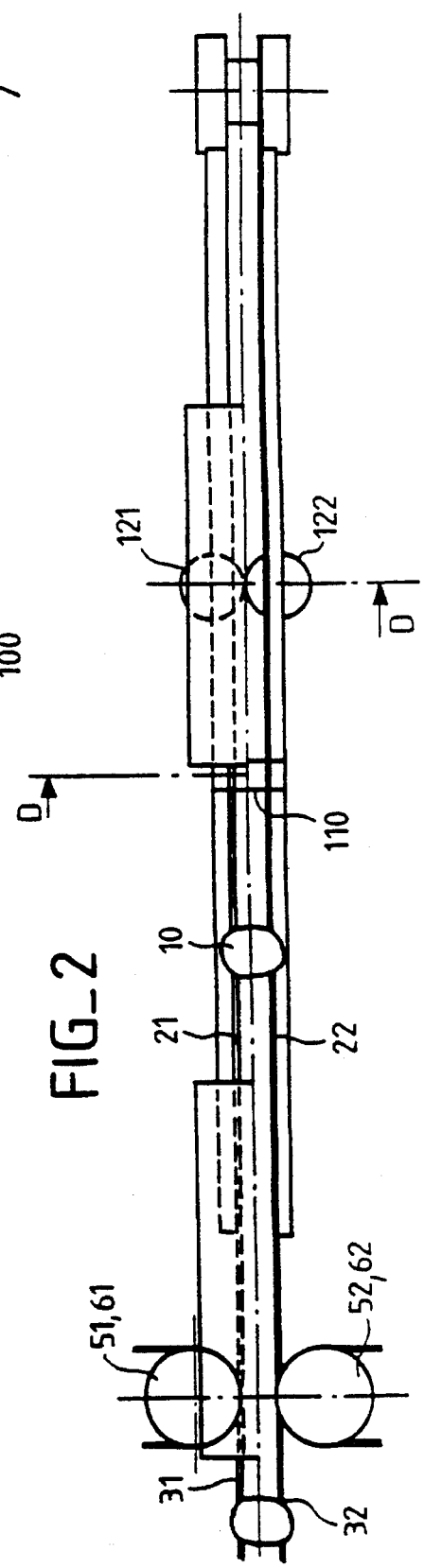

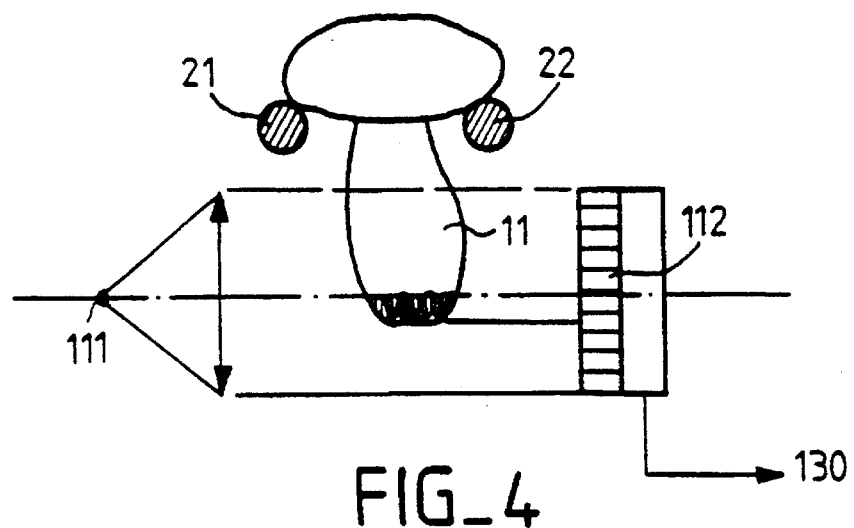
FIG_4
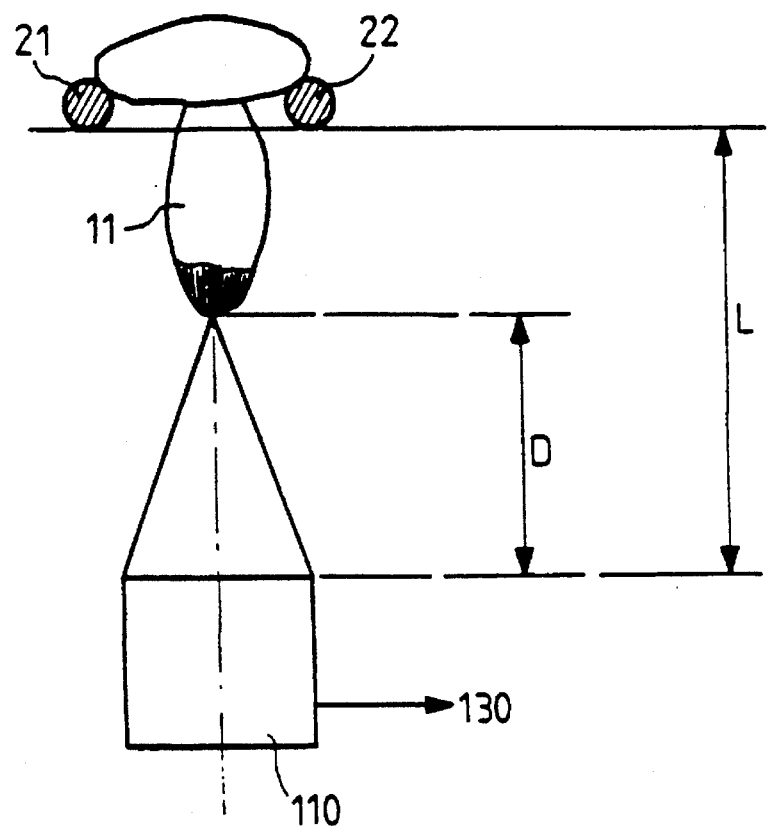
FIG_3

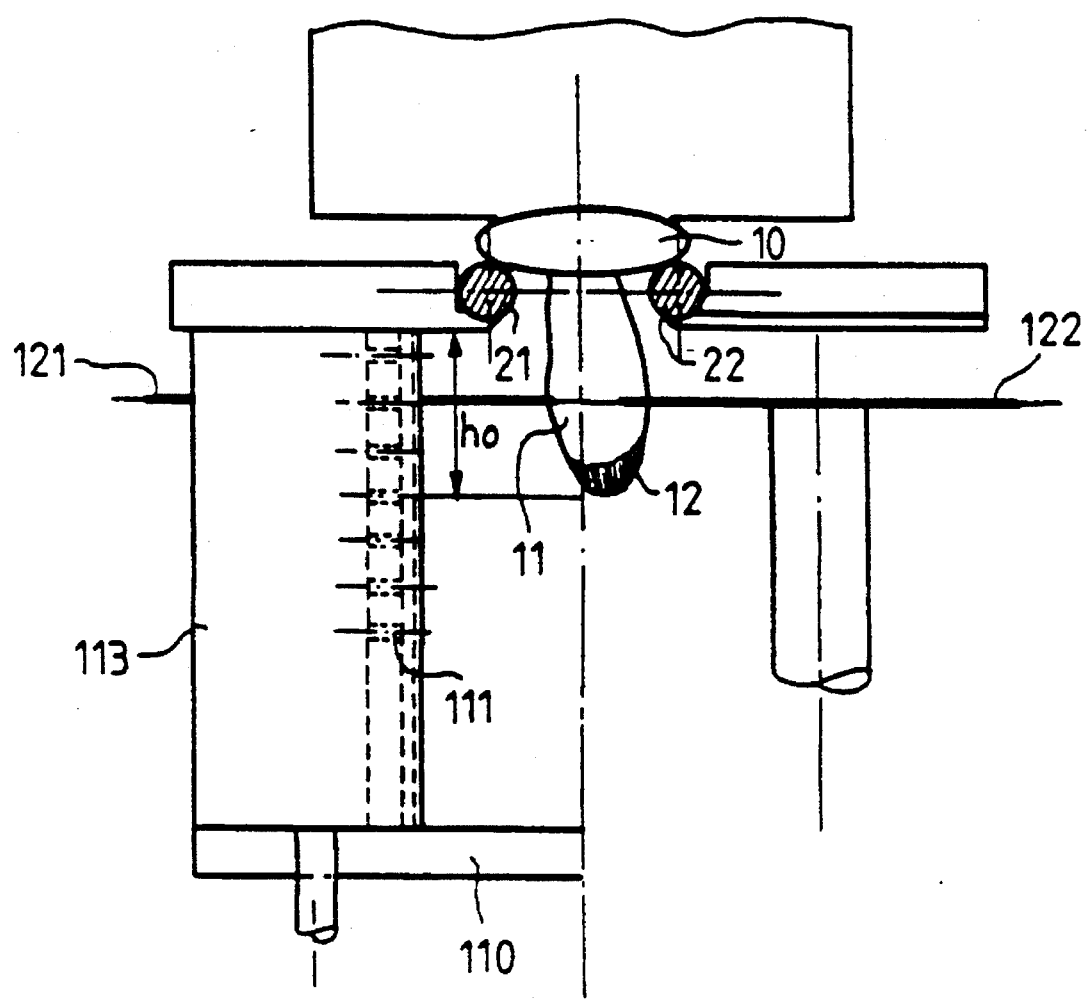
FIG_5

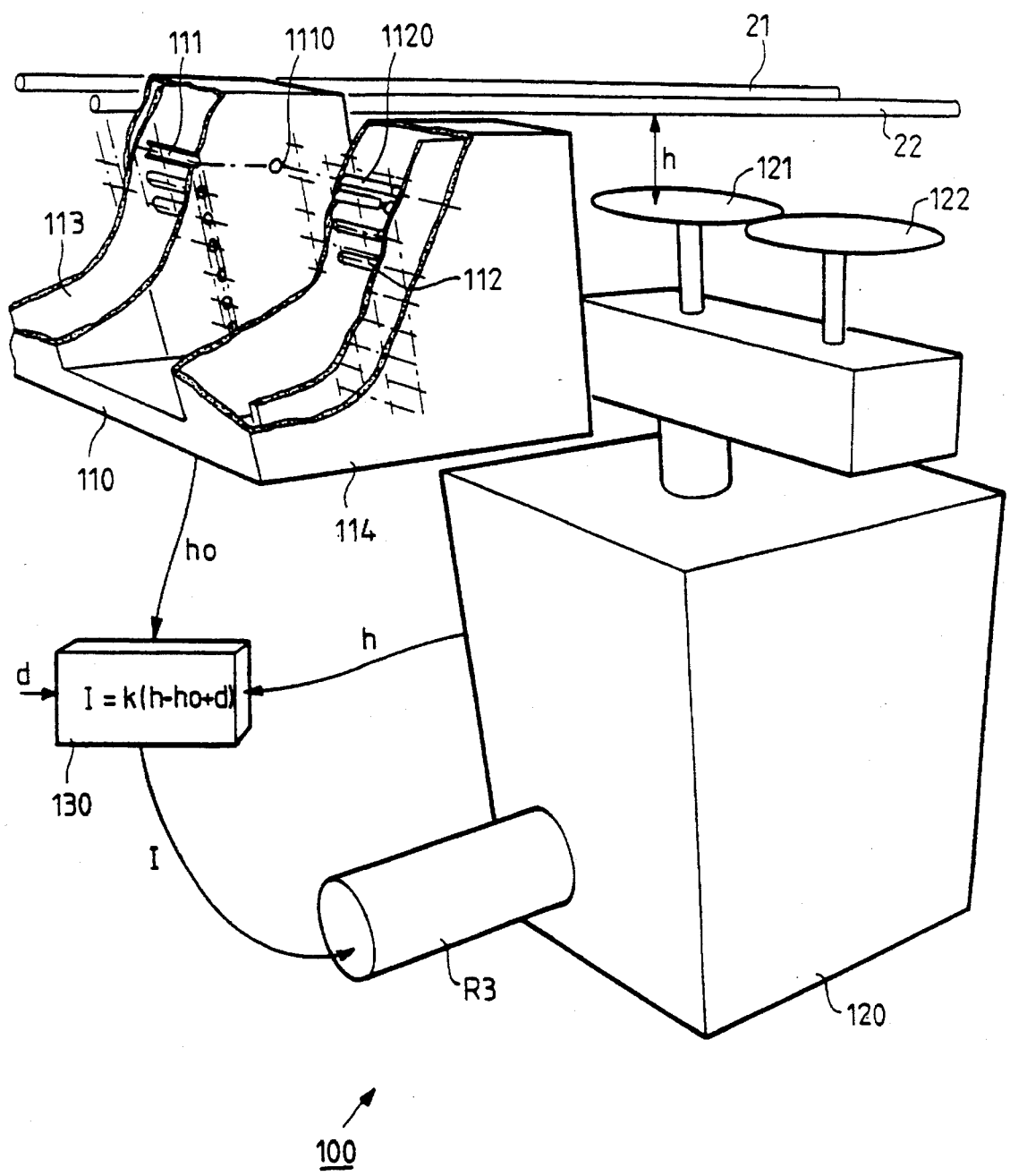

DEVICE FOR AUTOMATIC CUTTING OF MUSHROOM STEMS

The present invention relates to an installation for the automatic cutting of mushroom stems, comprising conveying means capable of bringing the said mushrooms to a cutting station comprising a cutting device intended to trim the mushrooms individually.

The invention has a particularly advantageous application in the field of trimming cultivated mushrooms, in particular before canning them.

In general, the purpose of the operation of cutting the mushroom stems, also called trimming, is to eliminate as waste product the ends of stems on which cultivation residues remain, such as earth, compost or mycelian fibres.

French patent N° 2 276 005 discloses, for example, an installation for the automatic cutting of mushroom stems according to the preamble in which conveying means, constituted by two substantially parallel belts, carry the mushrooms to a cutting device whose position with respect to the belts is fixed.

The disadvantage of this type of installation is that, the size of the mushroom stems being very variable depending on their source, the cutting height is not always optimum. In particular, for mushrooms whose stems are very long, a large quantity of material is lost, while the shortest mushroom stems can escape cutting, giving untrimmed mushrooms at the output of the installation which then have to be separated out manually.

In order to overcome this disadvantage, provision is sometimes made to subject the mushrooms to a preliminary sorting in order to retain only those for which the stem cutting can take place at an appropriate height. The mushrooms which do not conform at the preliminary sorting are rejected. However, this technique requires an additional operation which reduces the productivity of the installation.

Furthermore, the technical problem to be solved by the subject of the present invention is the production of an installation for the automatic cutting of mushroom stems according to the preamble which would produce an increase in material because of the optimisation of the height of the cut waste, and an increase in productivity because of the elimination of sorting stations.

The solution to the technical problem presented consists, according to the present invention, in that the said cutting station also comprises, on the one hand, an optical device for recognising the shape of the mushroom capable of supplying a control signal representing the exact length (ho) of the stem of each mushroom and, on the other hand, control means capable of accurately and continuously adjusting the relative position of the cutting device and of the mushroom stem as a function of the control signal supplied by the optical shape recognition device, without risk of errors caused by the possible presence of mycelian fibres extending the mushroom stem.

Thus, it is possible to cut the stems of the mushrooms at a height adapted to each mushroom taken individually in order to limit the cutting to the waste alone without loss of material. The relative position of the cutting device with respect to the mushroom being adjustable, it is of no use to sort the mushrooms according to the length of their stems, and this gives the sought increase in productivity.

According to a first embodiment of the installation of the invention, the said detection means comprise an infra-red telemetry device.

In a second embodiment of the installation according to the invention, the said detection means comprise an optical shape recognition device capable of supplying the said control means with a control signal representing the length of the stem of each mushroom. In particular, it is foreseen that the said plurality of receivers constitutes a video recording device. It is also envisaged that the said optical shape recognition device comprises, on the one hand, at least one radiation transmitter and, on the other hand, facing the said transmitter, at least one plurality of receivers of the said radiation, the said transmitter and the said plurality of receivers being disposed on the path of the mushrooms in such a way that, during conveying, the stems of the said mushrooms intercept the said radiation.

The following description, referring to the appended drawings, given by way of non-limitative examples, will give a good understanding of what the invention comprises and of how it may be embodied.

FIG. 1 is a side view of an installation for the automatic cutting of mushroom stems according to the invention.

FIG. 2 is a plan view of the installation of FIG. 1.

FIG. 3 is a side view of a first embodiment of a detection means of the invention.

FIG. 4 is a side view of a second embodiment of a detection means of the invention.

FIG. 5 is a cross-section through the line D—D of FIG. 2 of a third embodiment of a detection means of the invention.

FIG. 6 is a perspective diagram of a cutting station using the detection means of FIG. 5.

FIGS. 1 and 2 show an installation for the automatic cutting of the stems 11 of mushrooms 10. These mushrooms can be, for example, cultivated mushrooms. As shown in FIG. 1, the stems 11 of these mushrooms have waste 12 at their ends, this waste being constituted by cultivation residues such as earth, compost or mycelian fibres. This waste 12 must obviously be eliminated before the mushroom is processed in order to be canned, for example.

The cutting of the waste 12 is carried out by means of the installation shown in FIGS. 1 and 2. This installation comprises conveying means comprising a pair of parallel belts 21, 22 which clamp the mushrooms 10 in a vertical direction. The belts 21, 22 are driven in a longitudinal movement which brings the mushrooms 10 to a cutting station 100 comprising a cutting device 120 intended to trim the mushrooms individually and which, in the example of FIGS. 1 and 2, comprises two circular saws 121, 122. It is essential to remember here that the cutting device 120 is, for each processing line, a single tool, that is to say one having a single cutting plane whose relative position with respect to the mushroom can be adjusted accurately and continuously.

As shown in FIG. 1, the cutting station 100 also comprises, on the one hand, detection means 110 capable of individually determining the length ho of the stem 11 of each mushroom 10 and, on the other hand, control means 130 capable of adjusting the relative position of the cutting device 120 and of the mushroom stem 11 as a function of the length of the stem determined by the said detection means 110.

In the described embodiment, the cutting device is fixed and the control means 130 are capable of adjusting the position of the mushroom stems with respect to the cutting device by the intermediary of two eyelets 141, 142 respectively fitted over the belts 21 and 22 and connected by two cables 151, 152 to a moving lever arm 150.

Thus, for each mushroom, the cutting height h can be adjusted to a value ho−d, d being the length of waste to be cut, and this being so no matter what the height ho of the mushroom stem in question may be. This result is a big advantage of the invention because, despite the great spread in ho which can vary from 5 to 60 mm, it is possible to obtain, without preliminary sorting, a perfect trimming of the mushrooms limiting the quantity of lost material and avoiding any remains of cultivation residues on the cut stem.

It will be noted that, at the moment of cutting, the mushrooms are held in position by means of a first pressure roller 200 made of foam, for example.

FIG. 3 shows a first embodiment of the invention in which the detection means 110 comprise an infra-red telemetry device allowing the measurement of the distance D between the end of the mushroom stem and a fixed reference plane linked to the said infra-red telemetry device. The distance L between the fixed plane and the plane of the belts 21, 22 being known, the height ho of the mushroom stem is derived from this by ho=L−D FIG. 4 shows another embodiment of the invention in which the said detection means 110 comprise an optical shape recognition device capable of supplying the said control means 130 with a signal representing the length ho of the stem of each mushroom. The optical device shown in FIG. 4 comprises a transmitter 111 of radiation facing which is placed a plurality of detectors 112 forming a video recording device, a charge transfer device (CCD) video camera, for example. This video recording device receives the shadow of the mushroom stems when they are illuminated by the transmitter 111, possibly associated with projection optics. The transmitter 111 and the plurality of receivers 112 are disposed on the path of the mushrooms in such a way that, during conveying, the stems 11 of the said mushrooms intercept the said radiation.

FIGS. 5 and 6 show another embodiment of an optical shape recognition device capable of supplying the said control means 130 with a signal representing the length ho of the stem of each mushroom. In the embodiment shown in FIGS. 5 and 6, this optical shape recognition device is constituted by an optical fork comprising, on a first branch 113, a plurality of radiation transmitters 111 and, facing the transmitters 111, a plurality of receivers 112 of the said radiation aligned along a second branch 114 of the fork, the said optical fork being disposed on the path of the mushrooms 10 in such a way that, during conveying, the stems 11 of the said mushrooms move between the branches 113, 114 of the fork and intercept the said radiation.

The radiation transmitters 111 can be light emitting diodes associated, for example, with photodiodes or phototransistors as radiation receivers 112. By way of example,the optical fork 110 can comprises on each branch a barrier of transmitters, and, respectively, of receivers, of height 45 mm, separated by 5 mm.

According to the diagram in FIG. 6, the signal coming from the optical fork 110, representing the height ho of the mushroom stems, is applied to the control means 130 which furthermore receives a shift signal proportional to the height d of the waste to be cut and a signal coming from a position sensor which is not shown and which represents the position h of the cutting device 120.

According to one embodiment of the invention in which the control means are capable of adjusting the position of the cutting device with respect to the mushroom stems, these various signals are processed by the control means 130 in such a way as to supply a drive motor 123 for the height of the cutting device with a servocontrol signal s of the form s=k(h−ho+d)

k being a constant depending on the servocontrol loop. The motor 123 then drives the cutting device 120 in one or other of the directions until the signal is cancelled out, that is to say when the cutting height h is equal to ho−d.

If it is desired to measure the speed of progression of the mushrooms, provision is made for the optical fork to comprise an additional radiation transmitter 1110 and an additional radiation receiver 1120 which are, preferably, located at the height of the transmitter and receiver at the top of the barriers of transmitters and receivers, at a distance of 50 mm, for example, from the latter. In order to determine the speed, it suffices to integrate the time taken by the mushroom to travel these 50 mm.

Knowledge of the speed of progression allows the elimination of errors caused by mycelian fibres which could be interpreted as mushroom stems. By measuring the time of passage of the shadow of the stem at the level of each receiver, and by multiplying this passage time by the speed of progression, the dimension of the stem in the direction of progression is determined. If this dimension is less than 3 mm, for example, the passage through zero of the photoelectric signal from the corresponding receiver is not taken into account.

The influence of mycelian fibres can also be eliminated by using homologous arrays of transmitters and receivers comprising for example two barriers of transducers translated with respect to each other by 3 mm, for example. If, during the passage of the mushrooms, the two receivers located at a same height do not simultaneously give a zero photoelectric signal, the passage through zero of neither of these photoelectric signals is taken into account.

The array can be more complex and comprise barriers of staggered transducers, with the advantage of increasing the resolution of the detection means.

According to a particular embodiment, the optical fork 110 is made of plastic material. The transmitters and the receivers are respectively protected by a cemented sheet of glass which is not shown and on which a laminar air Jet is positioned for the purpose of eliminating water and particles coming from the mushrooms. The fluid-tightness of the fork must be perfect in order to prevent any condensation in front of a transmitter or receiver.

In order to take account of the fact that the cutting device, such as the circular saws 121, 122, can have a dimension which is not negligible in the direction of movement of the mushrooms, provision is made for the means of conveying the mushrooms to comprise separating means capable of imposing a separation of the mushrooms before their passage into the cutting device. This separation must be sufficient to allow the circular saws, for example, to move between two consecutive mushroom stems.

As shown in FIGS. 1 and 2, such a separation can be obtained by causing the mushrooms to accelerate on passing from an upstream pair of belts 31, 32 moving with a speed $V_1$, by being driven by means of a first set of pulleys 51, 52, to the downstream pair of belts 21, 22 whose speed $V_2$, greater than $V_1$, is imparted by the intermediary of a second set of pulleys 61, 62. If two mushrooms are initially separated by the distance $d_1$, they will have a separation $d_2$ at the level of the cutting device 120 given by:

$d_2 = d_1 \, V_2/V_1$.

At the moment of passing from one pair of belts to the other, the mushrooms are held in position by a second pressure roller 300.

It will be noted that the particular nature of the cutting devices described here is in no way restrictive. These cutting devices may for example equally well be embodied in the form of a saw blade, a cold or hot wire, driven or not driven with a progressive movement, high-pressure air, a water Jet, a laser or the like.

As a result of the fact, for example, of a high flow rate of mushrooms, it may be the case that the stem of a given mushroom, whose length has been determined by the detection means, is not immediately cut by the cutting device, but only after the n-1 preceding mushrooms have been trimmed. In this case, provision is made for the said control means 130 to comprise means of storage of the lengths of the last n mushrooms, determined by the detection means 110. These storage means may for example by constituted by a shift register which is incremented by one position after each passage of a mushroom into the cutting device. Thus, a given mushroom will always be trimmed at the appropriate height, even at a later time.

It is also possible for two mushrooms of different height to be too close to each other to be trimmed separately because of the fact, in particular, of too long a response time of the cutting device. In order to remedy this situation, provision is made for the said control means 130 to comprise means capable of adjusting the relative position of the cutting device 120 and of the consecutive mushroom stems which are too close as a function of the length of stem determined for the shortest mushroom. In this way it is ensured that both mushrooms will be trimmed correctly.

It is also appropriate to note that, in the described embodiment, the mushroom is presented to the detection means in a "stem downwards" position. However, it is perfectly possible to consider the mushroom being conveyed in another position, for example in the "stem upwards" position. Under these conditions, the system should simply be reversed.

Finally, detection means other than those described above may be considered, such as an echographic device.

I claim:

1. Machine for automatic cutting of mushroom stems comprising (a) conveying means capable of bringing the mushrooms to (b) a cutting station comprising (i) a cutting device for trimming the mushrooms individually, (ii) an optical device for recognizing the shape of each mushroom and for supplying a control signal representing the exact length of the stem of each mushroom excluding mycelian fiber extending from the mushroom stem, and (iii) control means capable of accurately and continuously adjusting the relative positions of the cutting device and the mushroom stem as a function of the control signal.

2. Machine according to claim 1, wherein the conveying means comprises separating means capable of imposing a separation of the mushrooms before their arrival at the cutting station.

3. Machine according to claim 2, wherein the separating means causes the mushrooms to accelerate by passing from an upstream set of belts moving with a speed $V_1$ to a downstream set of belts moving with a speed $V_2$, which is greater than $V_2$.

4. Machine according to claim 1, wherein said control means adjusts the position of each mushroom stem with respect to the position of the cutting device.

5. Machine according to claim 1 wherein said control means adjusts the position of the cutting device with respect to the position of each mushroom stem.

6. Machine according to claim 5 wherein said optical device comprises (i) at least one radiation transmitter facing at least one plurality of receivers of radiation emitted by the at least one transmitter, said at least one transmitter and said at least one plurality of receivers being disposed to effect, during conveying, the interception of said radiation by the mushroom stems.

7. Machine according to claim 6 wherein the at least one plurality of receivers constitutes a video recording device.

8. Machine according to claim 6, wherein said optical device includes an optical fork comprising, on a first branch, said at least one transmitter and, on a second branch, said at least one plurality of receivers.

9. Machine according to claim 8, wherein said optical device comprises an additional transmitter and an additional receiver intended for measuring speed of progression of the mushrooms.

10. Machine according to claim 8, wherein said optical device comprises an array of the radiation transmitters facing a homologous array of the plurality of receivers.

11. Machine according to claim 10, wherein the transmitter array, the receiver array, or both the transmitter array and the receiver array comprises barriers of staggered transducers.

12. Machine according to claim 1, wherein said control means comprises means of storage of the lengths of the mushroom stems determined by the optical device.

13. Machine according to claim 1, wherein said control means is capable of adjusting the relative positions of the cutting device and the stems of two consecutive mushrooms as a function of the stem length of the shorter mushroom.

* * * * *